US009772804B2

(12) United States Patent
Ito

(10) Patent No.: US 9,772,804 B2
(45) Date of Patent: Sep. 26, 2017

(54) JOB PROCESSING APPARATUS, CONTROL METHOD, AND PROGRAM THAT PROCESSES A PLURALITY OF JOBS IN RESPONSE TO RECEPTION OF EXECUTION INSTRUCTIONS THEREOF

(75) Inventor: Yuki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/495,946

(22) Filed: Jun. 13, 2012

(65) Prior Publication Data
US 2013/0003118 A1 Jan. 3, 2013

(30) Foreign Application Priority Data
Jun. 30, 2011 (JP) .................................. 2011-146504

(51) Int. Cl.
*G06K 15/02* (2006.01)
*G06F 3/12* (2006.01)
(52) U.S. Cl.
CPC .......... *G06F 3/1208* (2013.01); *G06F 3/1259* (2013.01); *G06F 3/1262* (2013.01); *G06F 3/1288* (2013.01)
(58) Field of Classification Search
CPC .... G06F 3/1208; G06F 3/1259; G06F 3/1262; G06F 3/1288
USPC .................................. 358/1.15; 709/201, 234
See application file for complete search history.

(56) References Cited

U.S. PATENT DOCUMENTS

| 6,474,881 | B1* | 11/2002 | Wanda | G06F 3/1207 400/61 |
|---|---|---|---|---|
| 7,315,404 | B2* | 1/2008 | Kimura | G06F 3/1207 358/1.13 |
| 8,970,879 | B2* | 3/2015 | Nakamura | G06F 3/1212 358/1.1 |
| 2002/0041395 | A1* | 4/2002 | Kimura | G06F 3/1204 358/1.15 |
| 2004/0010567 | A1* | 1/2004 | Moyer | G06F 3/1222 709/219 |
| 2006/0082816 | A1* | 4/2006 | Daniel | H04N 1/00204 358/1.15 |
| 2006/0158674 | A1* | 7/2006 | Mizoguchi | G06F 3/1205 358/1.13 |
| 2006/0203285 | A1* | 9/2006 | Yamaguchi | G06F 3/1204 358/1.15 |
| 2007/0297003 | A1* | 12/2007 | Kuroshima | G06F 3/1262 358/1.15 |

(Continued)

FOREIGN PATENT DOCUMENTS

CN 1804782 A 7/2006
CN 101071364 A 11/2007
(Continued)

*Primary Examiner* — Vincent Rudolph
*Assistant Examiner* — Edwin S Leland, III
(74) *Attorney, Agent, or Firm* — Canon U.S.A., Inc. IP Division

(57) ABSTRACT

When a job processing apparatus receives an execution instruction of a job including group identification information used for identifying a group, the job processing apparatus continuously processes a plurality of jobs that belong to the group identified by the group identification information such that the plurality of jobs are not interrupted by a job that belongs to a different group, and further notifies a state of each of the plurality of processed jobs.

9 Claims, 17 Drawing Sheets

(56) References Cited

U.S. PATENT DOCUMENTS

| | | | | |
|---|---|---|---|---|
| 2008/0239382 A1* | 10/2008 | Matsueda | G06F 3/121 | 358/1.15 |
| 2009/0080022 A1* | 3/2009 | Tsutsumi | G06F 3/1204 | 358/1.15 |
| 2010/0020354 A1* | 1/2010 | Ito | G03G 15/6508 | 358/1.15 |
| 2010/0123917 A1* | 5/2010 | Minagawa | G06F 3/1296 | 358/1.9 |
| 2011/0085196 A1* | 4/2011 | Liu | G06F 3/1204 | 358/1.15 |
| 2011/0235091 A1* | 9/2011 | Cain | G06F 3/1204 | 358/1.15 |
| 2011/0235093 A1* | 9/2011 | Cain | G06F 3/1204 | 358/1.15 |
| 2011/0317215 A1* | 12/2011 | Ida | G06F 3/1222 | 358/1.15 |
| 2012/0194850 A1* | 8/2012 | K. | G06F 3/1204 | 358/1.15 |
| 2012/0194852 A1* | 8/2012 | Chen | G06F 3/1203 | 358/1.15 |
| 2012/0212771 A1* | 8/2012 | Goddard | G06F 3/1204 | 358/1.15 |
| 2012/0314250 A1* | 12/2012 | Ito | H04N 1/00127 | 358/1.15 |
| 2013/0188219 A1* | 7/2013 | Ida | H04N 1/32144 | 358/1.15 |
| 2014/0092420 A1* | 4/2014 | Fukudome | H04N 1/0023 | 358/1.14 |
| 2015/0092233 A1* | 4/2015 | Park | G06F 3/1288 | 358/1.15 |

FOREIGN PATENT DOCUMENTS

| | | | | |
|---|---|---|---|---|
| EP | 1855189 A2 | 11/2007 | | |
| JP | 11119940 A | * | 4/1999 | |
| JP | H11-119940 A | | 4/1999 | |
| JP | 2002-182878 A | | 6/2002 | |
| JP | 2004-145554 A | | 5/2004 | |
| JP | 2004145554 A | * | 5/2004 | |
| JP | 2007-304814 A | | 11/2007 | |
| JP | EP 1855189 A2 | * | 11/2007 | G06F 3/1262 |
| JP | 2008-257342 A | | 10/2008 | |

* cited by examiner

FIG.7

DOCUMENT LIST

| | DOCUMENT NAME | DATE | NUMBER OF PAGES | SIZE |
|---|---|---|---|---|
| ☐ | aaa.doc | 2011/3/1 10:00 | 10p | 100k |
| ☐ | bbb.pdf | 2011/3/10 12:00 | 5p | 200k |
| ☐ | ccc.doc | 2011/3/20 9:00 | 20p | 300k |

705　701　702　703　704

PRINT　706

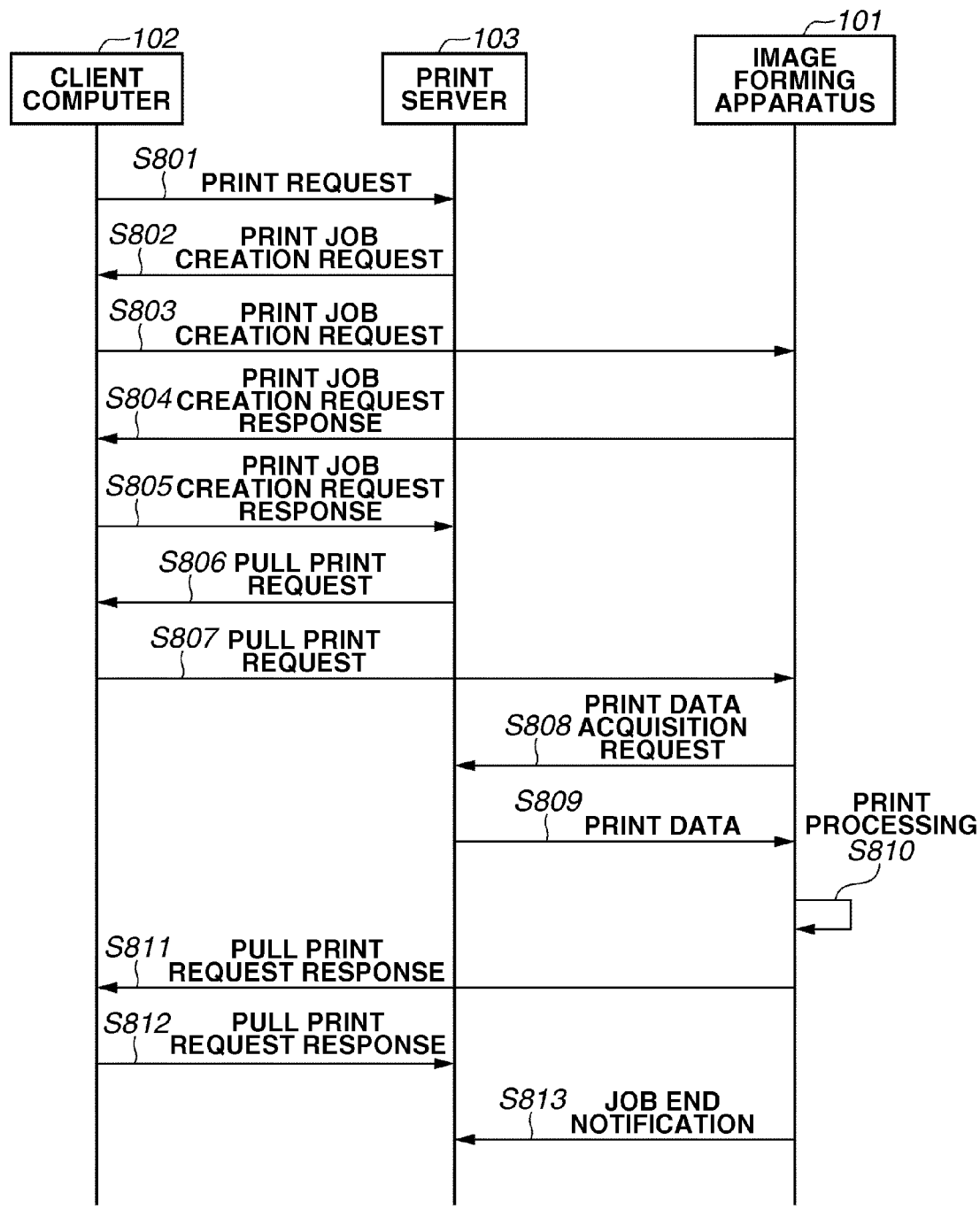

FIG.9A

```
<CreatePrintJobRequest>～901
    <PrintTicket>
        <JobDescription>
            <JobName>Sample-Job</JobName>
            <JobOriginatingUserName>Sample-User</JobOriginatingUserName>
        </JobDescription>
        <GroupId>1<GroupId>～902
        <GroupSize>2<GroupSize>～903
    </PrintTicket>
</CreatePrintJobRequest>
```

FIG.9B

```
<CreatePrintJobResponse>～911
    <JobId>1</JobId>～912
</CreatePrintJobResponse>
```

FIG.9C

```
<AddDocumentRequest>～921
    <JobId>1</JobId>
    <DocumentDescription>～922
        <DocumentId>1</DocumentId>
        <Compression>Gzip</Compression>
        <Format>unknown</Format>
    </DocumentDescription>
    <LastDocument>0</LastDocument>
    <DocumentUrl>http://PrintServer.cano.co.jp/job/job1</DocumentUrl>～923
</AddDocumentRequest>
```

FIG.13

| GroupId | GroupSize | PULL PRINT REQUEST RECEPTION NUMBER |
|---|---|---|
| 1 | 2 | 2 |
| 2 | 2 | 1 |
| 3 | 2 | 1 |

FIG.17

```
<SendDocumentRequest>~1701
    <JobId>1</JobId>
    <DocumentDescription>~1702
        <DocumentId>1</DocumentId>
        <Compression>Gzip</Compression>
        <Format>unknown</Format>
    </DocumentDescription>
    <LastDocument>0</LastDocument>
    <DocumentData>~1703
        [Data]
    </DocumentData>
</SendDocumentRequest>
```

JOB PROCESSING APPARATUS, CONTROL METHOD, AND PROGRAM THAT PROCESSES A PLURALITY OF JOBS IN RESPONSE TO RECEPTION OF EXECUTION INSTRUCTIONS THEREOF

BACKGROUND OF THE INVENTION

Field of the Invention

Conventionally, a job processing apparatus, such as an image forming apparatus, which is connected to a network is used by a plurality of computers on the network. Generally, if documents are printed by an image forming apparatus as a job processing apparatus that processes a print job, the image forming apparatus prints the documents in the order it accepts print jobs sent from the computer.

On the other hand, since the computer issues print target jobs of a plurality of documents as different jobs, even if a user desires to print a plurality of documents as one set of data, a print job issued from a different computer may interrupt the printing of the target documents and may be executed. In such a case, a document whose printing has been requested by a different user will be included in the plurality of target documents.

Under such circumstances, Japanese Patent Application Laid-Open No. 2002-182878 discusses a method that uses a group print job. The group print job includes a plurality of print jobs. The group print job is created by the computer and is useful in preventing interruption of a print job executed in the image forming apparatus.

Although the interruption of a print job by the image forming apparatus can be prevented by the above-described method, the method described above generates a new job (i.e., a group print job) including a plurality of print jobs. The group print job is managed as one job by the image forming apparatus. Thus, the image forming apparatus is unable to issue a job end notification for each of the plurality of documents included in the group print job.

SUMMARY OF THE INVENTION

The present invention is directed to preventing a plurality of jobs in a same group, which are processed by a job processing apparatus, from being interrupted by a job of a different group, and enabling management of each of the jobs in the same group.

According to an aspect of the present invention, a job processing apparatus includes a reception unit adapted to receive an execution instruction of a job including group identification information used for identifying a group, a processing unit adapted to continuously process a plurality of jobs that belong to the group identified by the group identification information when the execution instruction is received by the reception unit such that a job that belongs to a different group does not interrupt the plurality of jobs, and a notifying unit adapted to notify a state of each of the plurality of jobs processed by the processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a screen displaying a list of documents stored in the print server.

FIG. 8 is a sequence diagram of print processing according to the first exemplary embodiment.

FIGS. 9A, 9B, and 9C illustrate examples of messages transmitted/received by the image forming apparatus.

FIG. 13 illustrates an example of a group management table managed by the image forming apparatus.

FIG. 17 illustrates examples of messages transmitted/received by the image forming apparatus according to the second exemplary embodiment.

DESCRIPTION OF THE EMBODIMENTS

Various exemplary embodiments, features, and aspects of the invention will be described in detail below with reference to the drawings.

Figure 1:
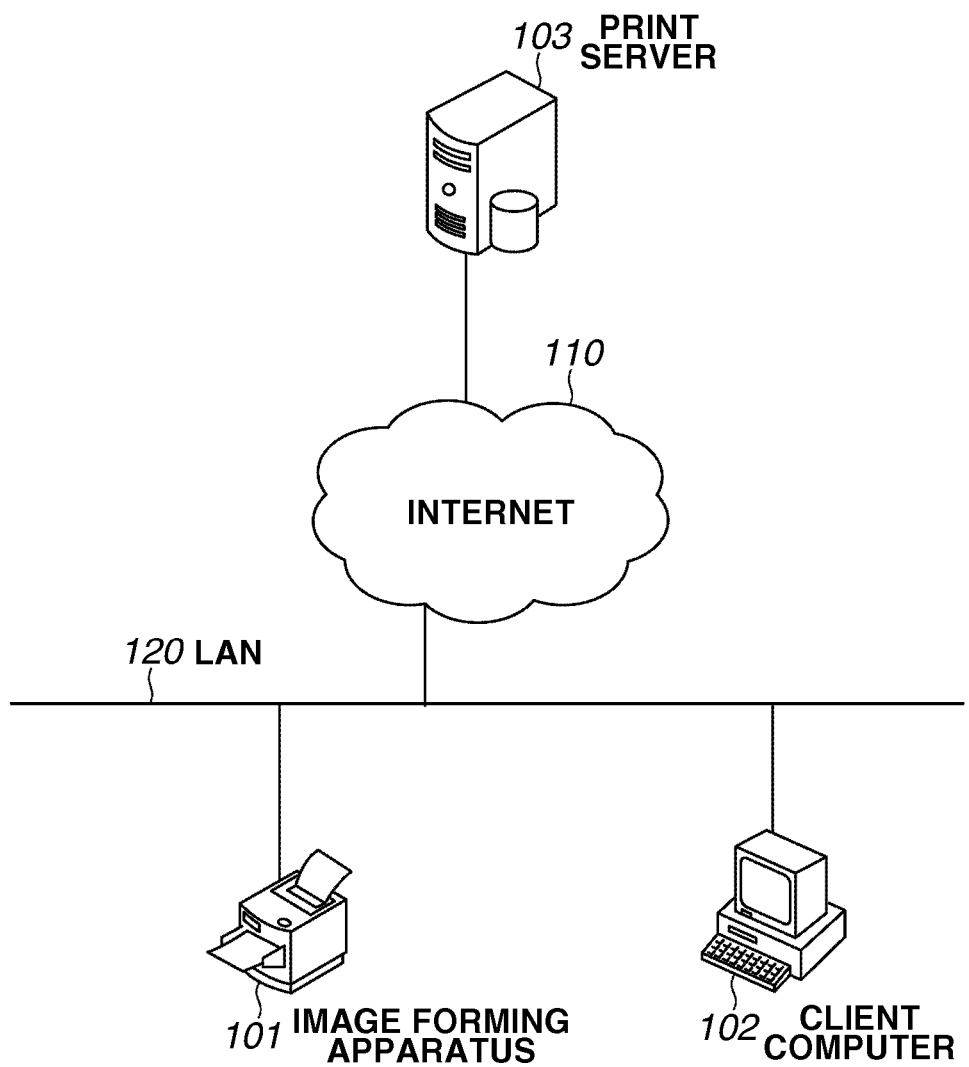
FIG. 1 illustrates a system configuration of a printing system according to a first exemplary embodiment of the present invention.

FIG. 1 illustrates a system configuration of a printing system according to a first exemplary embodiment of the present invention.

In the printing system in FIG. 1, an image forming apparatus 101 and a client computer 102 (hereinafter referred to as computer 102) on a local area network (LAN) 120 are connected to a print server 103 (hereinafter referred to as server 103) via the Internet 110. According to the present embodiment, an image forming apparatus that processes an image forming job (e.g., print job) is described as an example of a job processing apparatus that receives a job and processes it. Further, the client computer is used as an example of a client apparatus and the print server is used as an example of a client apparatus in the description below.

The image forming apparatus 101, which can communicate with the computer 102 and the server 103, has a print function. The image forming apparatus 101 receives print data transmitted from the computer 102 or the server 103 and prints the received print data. The computer 102, which can communicate with the image forming apparatus 101 and the server 103, instructs the image forming apparatus 101 to execute print processing.

The server 103, which communicates with the image forming apparatus 101 and the computer 102, performs processing according to a print request issued by the computer 102, management of a print job, and management of the image forming apparatus 101. Additionally, according to the present embodiment, the server 103 functions as a document management server that manages documents for each user. The server 103 can be separated into a plurality of servers having different functions.

The printing system of the present embodiment in FIG. 1 is capable of push printing and pull printing. When the push printing is performed, the computer 102 transmits the print data stored in the computer 102 to the image forming apparatus 101 and the image forming apparatus 101 prints the received print data. When the pull printing is performed, the image forming apparatus 101 acquires a document (print data) stored in the server 103 and prints the acquired print data. In the description below, a case where the image forming apparatus performs the pull printing will be described.

The LAN 120 in FIG. 1 is not necessarily a wired network and can be a wireless network. Further the LAN 120 can be realized by a combination of a wired network and a wireless network or by an arbitrary communication method. Further, the terminals on the LAN 120 and the Internet 110 are not limited to the apparatuses illustrated in FIG. 1 and other apparatuses can be connected to the networks. Further, regarding the printing system in FIG. 1, since the image forming apparatus 101 and the computer 102 are connected via the LAN 120, they can communicate with each other.

On the other hand, a firewall (not illustrated) exists between the LAN 120 and the Internet 110. The firewall blocks the communication from the Internet 110 to the LAN 120. Thus, although the communication from the image forming apparatus 101 to the server 103 and the computer 102 to the server 103 is allowed, the communication from the server 103 to the image forming apparatus 101 and from the server 103 to the computer 102 is blocked. The communication from the server 103 is allowed only when the server 103 responds to a request issued by the image forming apparatus 101 or the computer 102.

Figure 2:
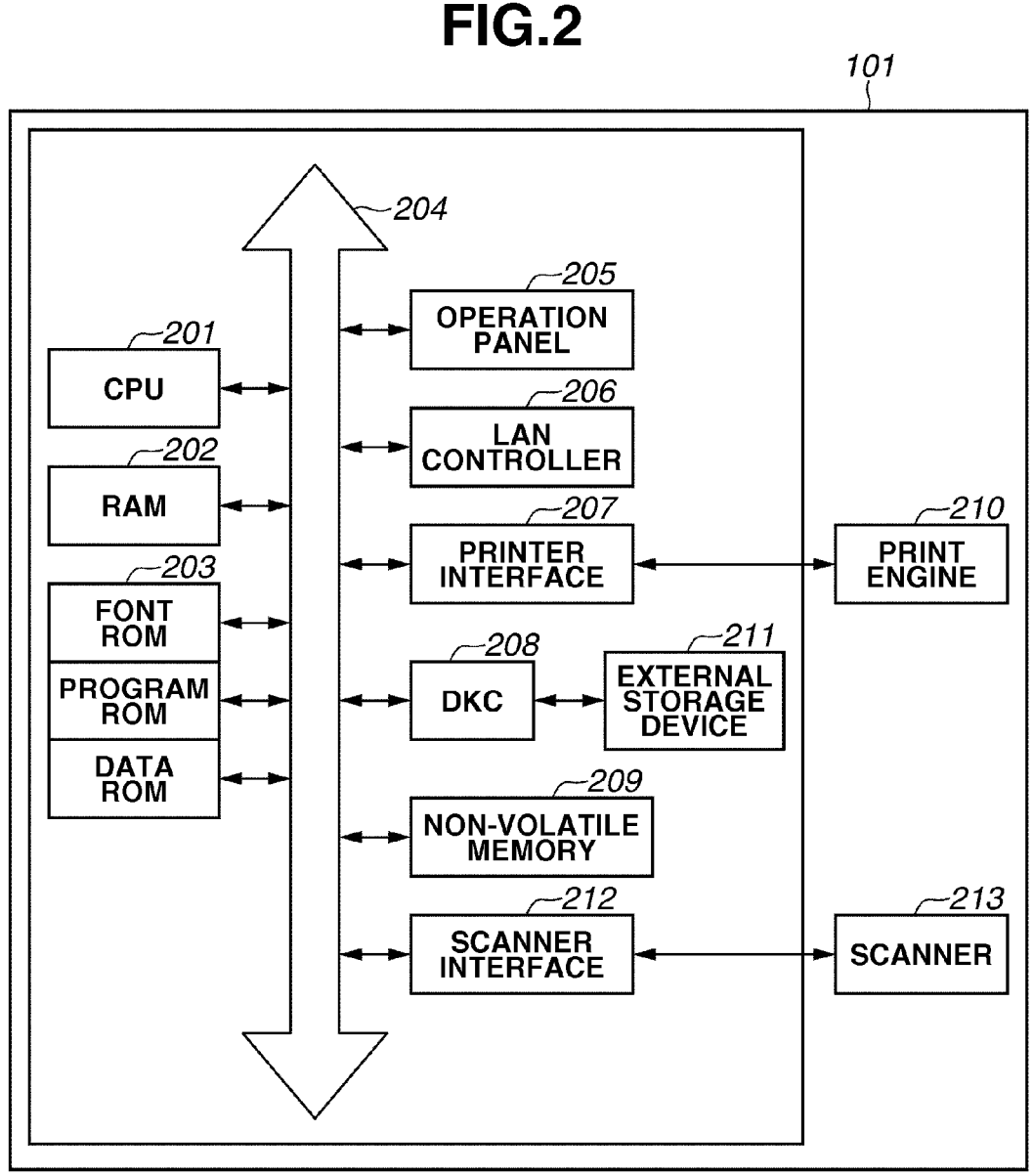
FIG. 2 is a block diagram illustrating a hardware configuration of an image forming apparatus.

FIG. 2 is a block diagram illustrating a hardware configuration of the image forming apparatus 101.

In the image forming apparatus 101 in FIG. 2, a central processing unit (CPU) 201 executes various types of processing based on a control program stored in a program read-only memory (ROM) in a ROM 203 or in an external storage device 211. The CPU 201 controls access of various devices connected to a system bus 204 in an overall manner. Further, the CPU 201 controls a printing unit (printer engine) 210 connected to the system bus 204 via a printer interface 207 and outputs an image signal to the printing unit. Furthermore, the CPU 201 controls a reading unit (scanner) 213 connected to the system bus 204 via a scanner interface 212 so that an image signal is output from the scanner 213.

Further, the control program which can be executed by the CPU 201 is stored in the program ROM in the ROM 203. Font data (including outline font data), which is used when the above-described output information is generated, is stored in a font ROM in the ROM 203. Information used by the computer 102 is stored in a data ROM in the ROM 203. The CPU 201 communicates with the computer 102, other image forming apparatuses, and the server 103 on the network via a LAN controller 206.

A random access memory (RAM) 202 functions mainly as a main memory and a work area of the CPU 201. By connecting an optional RAM to an extension port (not illustrated), the memory capacity of the RAM 202 can be expanded. The RAM 202 is used when data in a page description language (PDL) is rasterized into bitmap data. A disk controller (DKC) 208 controls access to the external storage device 211, which is a hard disk (HDD), a solid state drive (SSD) or the like.

The external storage device 211 stores an application program, font data, and form data. Further, the external storage device 211 is used as a job storage area for temporarily spooling a print job. The spooled print job can be controlled by an external device. Furthermore, the external storage device 211 is used as a BOX data storage area for storing BOX data. Image data obtained by the scanner 213 and image data of a print job is stored in the external storage device 211 as BOX data. The BOX data can be referenced by the computer 102 via the network. Further, the BOX data can be printed.

An operation panel 205 includes a display unit, which is a touch panel, and various hard keys. Various software keys are displayed on the display unit. The user inputs various types of information by using the software keys. The number of the above-described external storage device is not limited to one. To be more precise, the image forming apparatus includes at least one external storage device. The image forming apparatus may be configured such that a plurality of optional font cards of fonts other than built-in fonts and external memories storing programs used for interpreting printer control language of a different language system can be connected. A non-volatile memory 209 stores setting information set by the user via the operation panel 205.

Further, although not illustrated, a finisher as well as various function expansion devices can be set on the image forming apparatus 101. The finisher is used for stapling and sorting documents. The function expansion device is, for example, a two-sided printing device used for realizing a two-sided printing function. Operations of the function expansion devices are also controlled by the CPU 201. The hardware configuration of the image forming apparatus is not limited to the configuration illustrated in FIG. 2. In other words, any hardware configuration can be employed so long as the image forming apparatus includes at least a print function.

Figure 3:
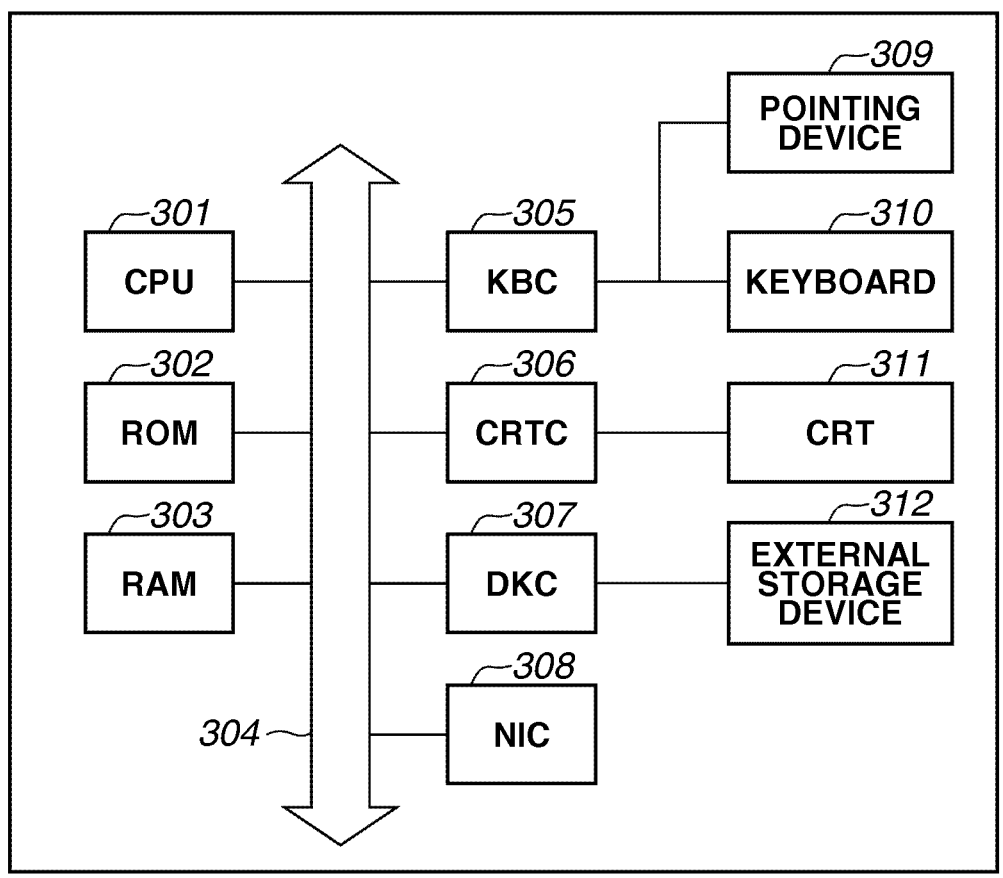
FIG. 3 is a block diagram illustrating a hardware configuration of a client computer and a print server.

FIG. 3 is a block diagram illustrating a hardware configuration of the computer 102 and the server 103.

In FIG. 3, a CPU 301 executes various types of processing based on a control program stored in a ROM 302 or an external storage device 312, and controls various devices connected to a system bus 304. The ROM 302 stores Basic Input/Output System (BIOS) and a boot program. A RAM 303 is used as a main storage device of the CPU 301. A keyboard controller (KBC) 305 performs processing regarding input of information from a pointing device 309 such as a mouse or a keyboard 310.

A display control unit 306 is a cathode ray tube controller (CRTC) and includes a video memory. When image data is rendered on the video memory according to an instruction issued by the CPU 301, the image data which has been rendered on the video memory is output to a CRT (display device) 311 as a video signal. In FIG. 3, although a CRT is illustrated as an example of the display device, any type of display device, including a liquid crystal display device, can be used. A disk controller (DKC) 307 is used when the external storage device 312 is accessed. The external storage device 312 is a device such as a hard disk (HDD) or a solid state drive (SSD). A network interface card (NIC) 308 connects the computer 102 or the server 103 to a network so that information communication via the network can be performed.

The external storage device 312 stores an operating system (OS) and various application programs that run on the OS. In the above-described configuration, if the power of the apparatus is turned on, the CPU 301 loads the OS from the external storage device 312 into the RAM 303 according to a boot program stored in the ROM 302. Then, the apparatus functions as an information processing apparatus.

Figure 4:
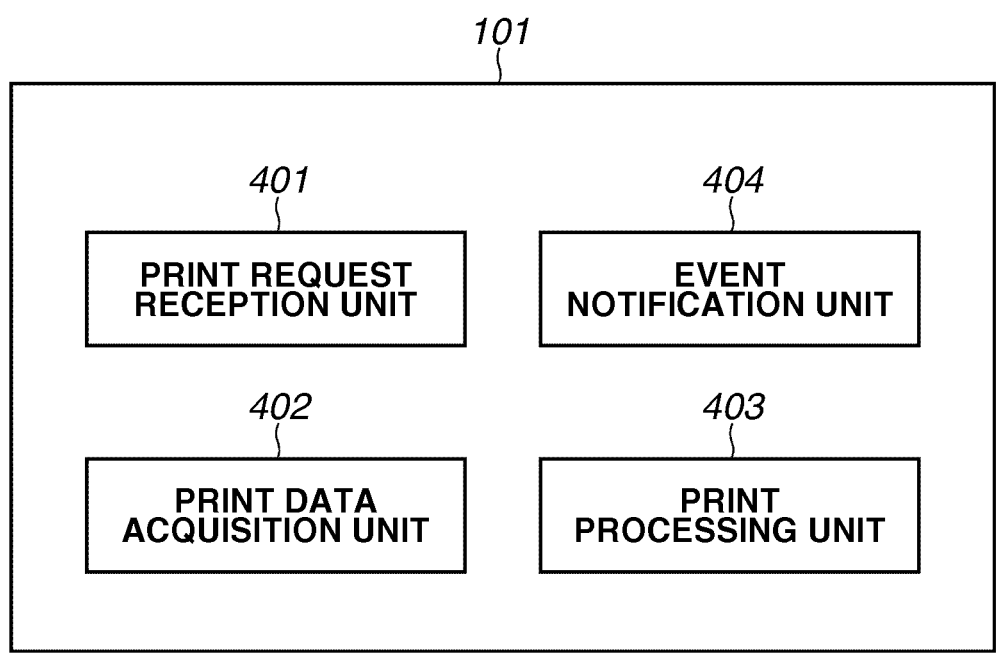
FIG. 4 is a block diagram illustrating a software configuration of the image forming apparatus.

FIG. 4 is a block diagram illustrating a software configuration of the image forming apparatus 101.

A print request reception unit 401 receives a print job creation request and a pull print request from the computer 102 via the LAN controller 206. The print request reception unit 401 also stores a uniform resource locator (URL) included in the pull print request in a job management table. This URL is used for acquiring print data as a target of the printing performed by the image forming apparatus 101. The URL is an example of specifying information used for specifying print data. Further, the print request reception unit 401 submits the print job stored in the external storage device 211 or the job management table in the RAM 202 to a print queue in the RAM 202.

A print processing unit 403 acquires the print job from the print queue and transmits the URL used for acquiring the print data to a print data acquisition unit 402. Normally, the URL includes an address of a terminal (the server 103 according to the present embodiment) that stores the print data and a path to the location where the print data is stored in the terminal. The print data acquisition unit 402 transmits the print data acquisition request to the received URL. Then, when the print data acquisition unit 402 receives print data as a response, the print data acquisition unit 402 sends the print data to the print processing unit 403. The print processing unit 403 analyzes the print data, converts it into bitmap data, and transmits the bitmap data to the printer engine 210 via the printer interface 207. Then, the print data is printed on paper.

An event notification unit 404 notifies the server 103 of the state of the print job. For example, the event notification unit 404 issues a job end notification. In addition to the job end notification, the event notification unit 404 issues a job start notification, a job suspend notification, an error occurrence notification, and other information about the state of the print job. The event notification unit 404 not only transmits notifications to an external apparatus such as the server 103 in providing notification but also displays a message on the display unit of the image forming apparatus 101.

Figure 5:
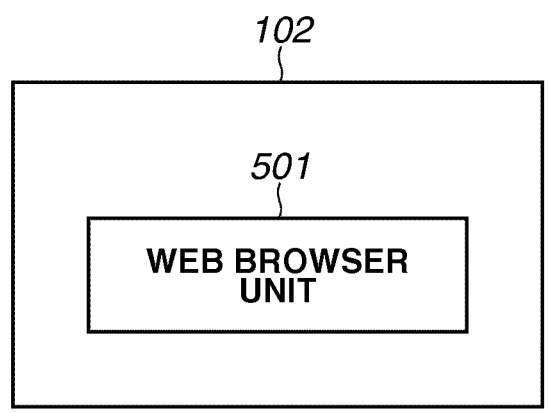
FIG. 5 is a block diagram illustrating a software configuration of the client computer.

FIG. 5 is a block diagram illustrating a software configuration of the computer 102.

The computer 102 according to the present embodiment includes, at least, a web browser unit 501. The user connects the computer 102 to the server 103 via the NIC 308 using the web browser unit 501. Thus, the computer 102 can check the documents stored in the server 103 and issue a print instruction of a desired document. Further, the web browser unit 501 receives a print job creation request and a pull print request from the server 103 and redirects them to the image forming apparatus 101.

Figure 6:
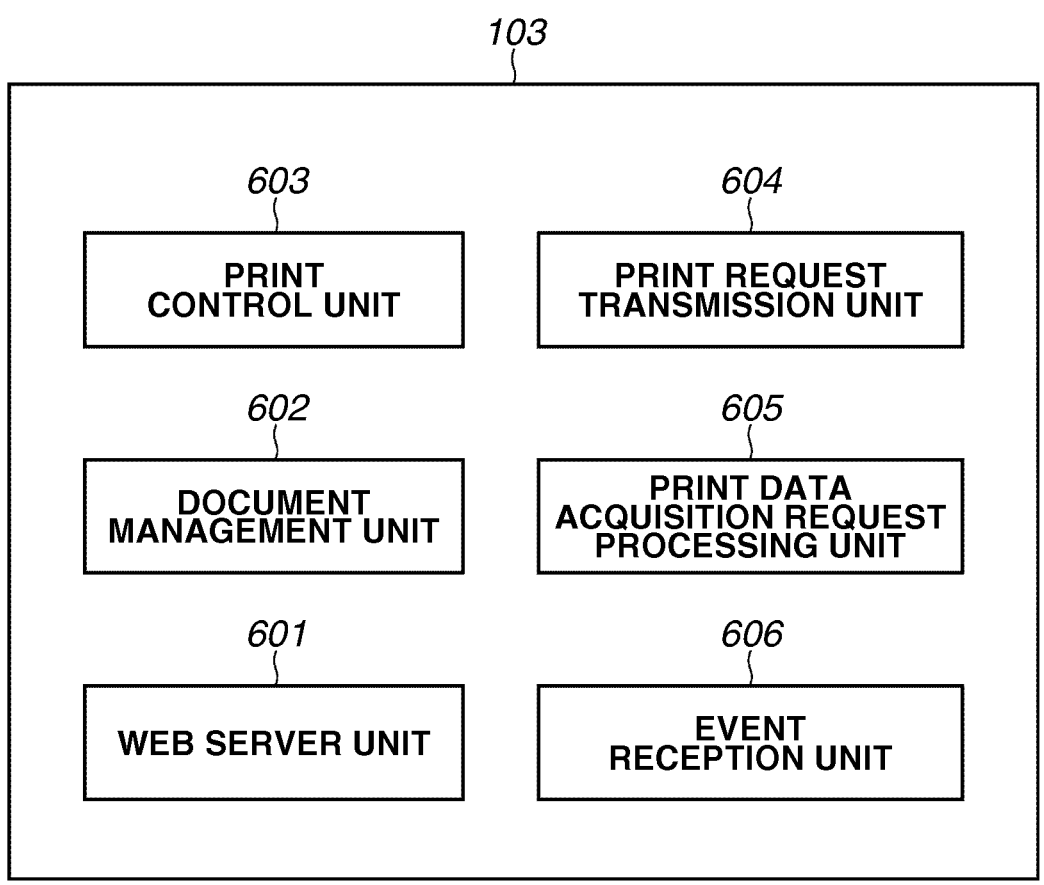
FIG. 6 is a block diagram illustrating a software configuration of the print server.

FIG. 6 is a block diagram illustrating a software configuration of the server 103.

A web server unit 601 provides a user interface (UI) for the computer 102. This UI is, for example, a UI regarding information of a document in the external storage device 312 managed for each user by a document management unit 602. To be more precise, in response to a request issued by the web browser unit 501 of the computer 102, the web server unit 601 transmits a file written in a page description language such as HyperText Markup Language (HTML) or Extensible Markup Language (XML) to the computer 102 via the NIC 308. This file is interpreted by the web browser unit 501 of the computer 102 and a UI to be displayed on the computer 102 is generated.

Further, the web server unit 601 receives a print instruction via the NIC 308. When the web server unit 601 receives the print instruction, a print control unit 603 generates print data intended for the designated image forming apparatus according to the print instruction and temporarily stores the print data. Print data intended for an image forming apparatus is, for example, image data in a format which can be processed by the image forming apparatus and PDL data generated by a printer driver of the image forming apparatus.

A print request transmission unit 604 creates a GroupId and a GroupSize. The GroupId is group identification information used for identifying a group including a plurality of print jobs. The GroupSize designates a number of print jobs included in the GroupId. The print request transmission unit 604 further transmits a print job creation request including the GroupId and the GroupSize to the computer 102. Additionally, the print request transmission unit 604 transmits a pull print request to the computer 102.

A print data acquisition request processing unit 605 receives a print data acquisition request from the image forming apparatus 101 and transmits the designated print data to the image forming apparatus 101. An event reception unit 606 receives a notification of a state of a print job from the image forming apparatus 101.

Next, flow of the print execution performed by the printing system of the present embodiment will be described. FIG. 7 illustrates a screen where a list of documents stored in the external storage device 312 of the server 103 is displayed by the web browser unit 501 of the computer 102.

According to the example in FIG. 7, a list of documents which can be accessed by a login user of the server 103 is displayed. The list includes various types of information including document name 701, date 702, page number 703, and size 704. When the user checks a check box 705 of a desired document and selects a print button 706 on the screen, printing is executed. By using the check box 705, the user can select a plurality of documents at a time. According to the present embodiment, the plurality of documents which have been selected are printed as one group and are not interrupted by a different document when they are printed. Further, printing of one document is processed as one job.

FIG. 8 is a sequence diagram illustrating a print processing sequence of one job performed by the printing system according to the present embodiment.

A program of the image forming apparatus 101 of this print processing sequence is stored in the external storage device 211 or the ROM 203 of the image forming apparatus 101. The program is loaded into the RAM 202 and executed by the CPU 201. Further, each program of the server 103 and the computer 102 is stored in the external storage device 312 or the ROM 302 of each apparatus, and is loaded into the RAM 303 and executed by the CPU 301.

In S801, the computer 102 accepts a print request of a document input by the user and transmits the print request to the server 103. In S802, the server 103 generates print data intended for the designated image forming apparatus and temporarily stores the data. Then, the server 103 transmits a print job creation request, such as the one illustrated in FIG.

9A, to the computer 102. The print job creation request, which is generated by the server 103, is a request for print job creation by the image forming apparatus 101.

According to the printing system of the present embodiment, an apparatus that transmits a job to the image forming apparatus needs to temporarily transmit the job creation request to the image forming apparatus so that a JobID is generated by the image forming apparatus. When the JobID is generated by the image forming apparatus and the generated JobID is notified to the apparatus that transmits the job, the apparatus designates the JobId when it transmits the job. Thus, the print job creation request in FIG. 9A needs to be finally transmitted to the image forming apparatus 101.

However, as described above, according to the printing system of the present exemplary embodiment in FIG. 1, the communication from the server 103 to the image forming apparatus 101 is blocked by a firewall. Thus, the server 103 transmits the job creation request to the computer 102 as a response to the print request issued by the computer 102 so that the computer can redirect the job creation request to the image forming apparatus 101.

In S803, the computer 102 redirects the print job creation request received from the server 103 to the image forming apparatus 101. When the image forming apparatus 101 receives the print job creation request from the computer 102, the image forming apparatus 101 creates a print job including a JobId. The JobId is job identification information used for identifying the print job.

In S804, the image forming apparatus 101 transmits a print job creation request response, such as the one illustrated in FIG. 9B, to the computer 102. The print job creation request response includes the JobId. The server 103 identifies the print job using the JobId.

In S805, the computer 102 redirects the received print job creation request response to the server 103. The server 103 identifies the print job by using the JobId in the print job creation request response.

In S806, the server 103 transmits a pull print request, such as the one illustrated in FIG. 9C, to the computer 102. The pull print request is generated by the server 103 and includes information of a URL which the image forming apparatus 101 uses when the image forming apparatus 101 acquires the print data. The pull print request also includes an execution instruction of the job which has been created according to the print job creation request. Thus, the final destination of this request is the image forming apparatus 101.

As described above, the communication from the server 103 to the image forming apparatus 101 is blocked by a firewall. Thus, the server 103 does not transmit the pull print request to the image forming apparatus 101 but transmits it to the computer 102 as a response to the print job creation request response.

In S807, the computer 102 redirects the pull print request received from the server 103 to the image forming apparatus 101.

In S808, the image forming apparatus 101 extracts the URL included in the pull print request which has been transmitted from the computer 102. Then, the image forming apparatus 101 transmits the print data acquisition request to the server 103 based on the URL. In S809, the server 103 transmits the print data, which has been specified by the URL included in the pull print request, to the image forming apparatus 101.

In S810, the image forming apparatus 101 processes the print data received from the server 103 and performs printing. In S811, when the printing ends, the image forming apparatus 101 transmits a pull print request response to the computer 102 as a response to the pull print request in S807.

In S812, the computer 102 redirects the pull print request response received from the image forming apparatus 101, to the server 103. In S813, the image forming apparatus 101 transmits a job end notification to the server 103. The job end notification is transmitted from the image forming apparatus 101 to the server 103 so as to notify the server 103 that the print processing has been finished. Further, since the job end notification is transmitted each time one job ends, according to the present embodiment where a print job is generated for each document, a job end notification is issued each time printing of one document ends.

If a job end notification is issued for each document to the server 103, the server 103 is able to know the end of the processing of each document transmitted to the image forming apparatus 101. Further, the server 103 internally manages the processing state of each document according to this notification. Since the user that operates the computer 102 can access the server 103 by using the web browser in the computer 102, the user is able to know the processing state of each document.

In FIG. 8, as described above, the server 103 does not directly transmit the print job creation request in S802 and the pull print request in S806 to the image forming apparatus 101 but temporarily transmits it to the computer 102. Then, the computer 102 redirects the print job creation request and the pull print request to the image forming apparatus 101. This is because, as described with reference to FIG. 1, a firewall exists between the LAN, on which the computer 102 and the image forming apparatus 101 exist, and the Internet, on which the server 103 exists, and access from the server 103 is blocked.

According to the present embodiment, by using the redirect processing of the computer 102, the pull print function can be realized in a system having the system configuration described above.

FIG. 9A illustrates an example of the print job creation request generated by the server 103. The example in FIG. 9A is written in an XML format.

A <CreatePrintJobRequest> tag 901 designates a print job creation request. A <GroupId> tag 902 designates a value of a GroupId. According to the present embodiment, a plurality of print job generation requests can have a same GroupId value. The print jobs are controlled in such a manner that when printing of print jobs having a same GroupId value is performed, the printing is not interrupted by a print job of a different GroupId value. A <GroupSize> tag 903 designates a GroupSize and is a value indicating the number of jobs of each GroupId. Print job creation requests having a same GroupId have a same GroupSize.

A print job creation request that does not include the <GroupId> tag 902 and the <GroupSize> tag 903 is a print job creation request of a single job. Further, a print job creation request that includes the <GroupId> tag 902 and the <GroupSize> tag 903 having a value of "1" is a print job creation request of a single job.

FIG. 9B illustrates an example of the print job creation request response generated by the image forming apparatus 101. The example in FIG. 9B is written in an XML format.

A <CreatePrintJobResponse> tag 911 designates a print job creation request response. A <JobId> tag 912 designates a JobId.

FIG. 9C illustrates an example of the pull print request generated by the server 103. The example in FIG. 9C is written in an XML format.

An <AddDocumentRequest> tag 921 designates a pull print request. A <JobId> tag 922 designates a JobId and corresponds to the <JobId> tag 912. A <DocumentUrl> tag 923 designates a URL used for specifying the print data. The image forming apparatus 101 transmits a print job acquisition request to this URL.

Figure 10:
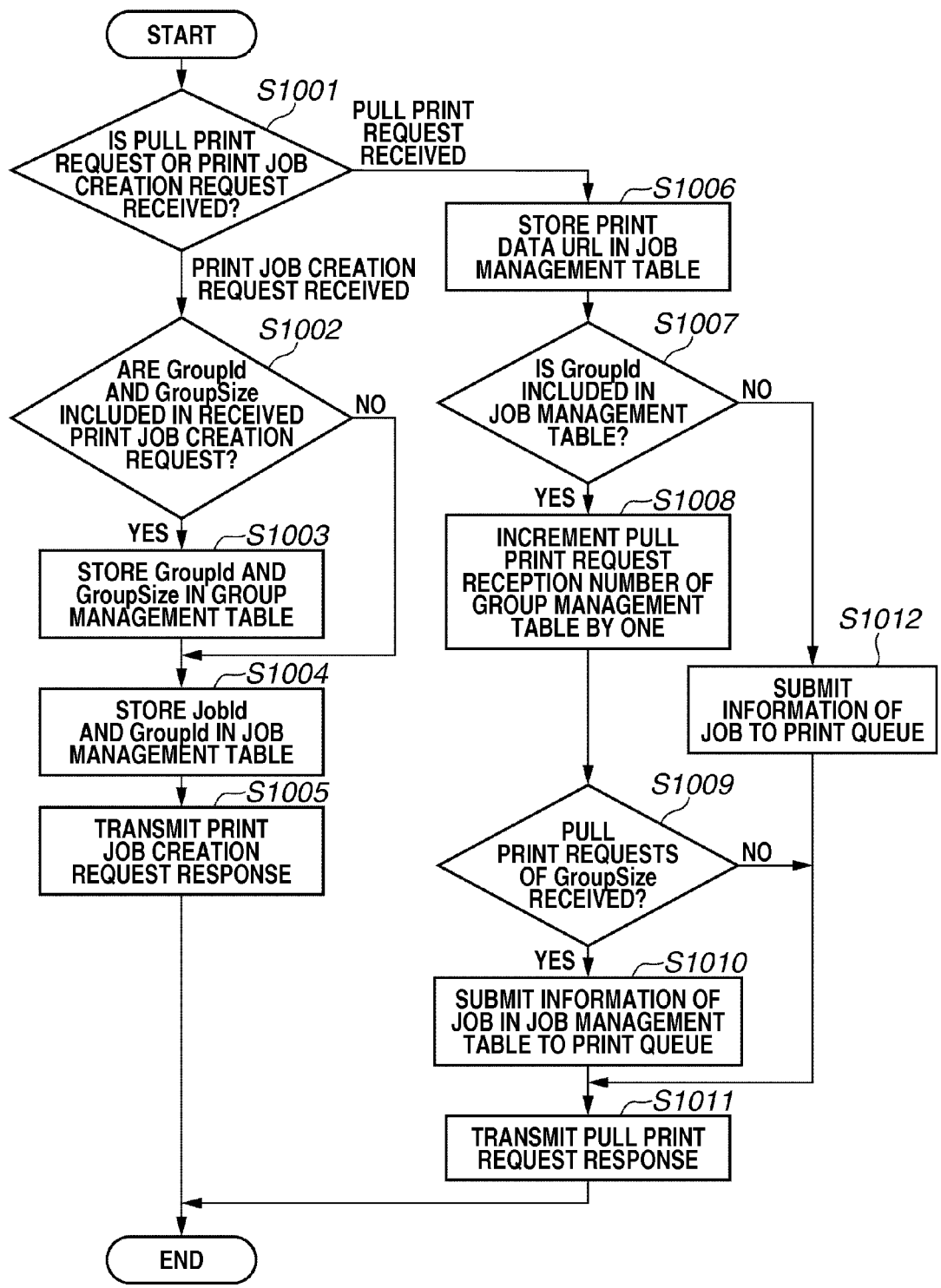
FIG. 10 is a flowchart illustrating processing executed by the image forming apparatus.

FIG. 10 is a flowchart illustrating processing performed by the image forming apparatus 101 when a program corresponding to the print request reception unit 401 of the image forming apparatus 101 is executed.

The program of this flow corresponding to the print request reception unit 401 is stored in the external storage device 211 or the ROM 203 of the image forming apparatus 101. The program is loaded into the RAM 202 and executed by the CPU 201.

In step S1001, the CPU 201 receives a message from the computer 102 and the CPU 201 analyzes the received message. If the received message is a print job creation request (PRINT JOB GENERATION REQUEST in step S1001), the processing proceeds to step S1002. In step S1002, the CPU 201 determines whether a GroupId and a GroupSize are included in the received print job creation request. If a GroupId and a GroupSize are included (YES in step S1002), the processing proceeds to step S1003.

In step S1003, the CPU 201 stores the GroupId and the GroupSize in a GroupId 1302 and a GroupSize 1303 in a group management table 1301 illustrated in FIG. 13. In step S1004, the CPU 201 generates a JobId and stores it in a JobId 1202 in a job management table 1201 illustrated in FIG. 12. When the JobId is stored in the JobId 1202, the GroupId included in the print job creation request is also stored in a GroupId 1203. In step S1005, the CPU 201 transmits the print job creation request response to the computer 102.

In step S1002, if the GroupId and the GroupSize are not included in the received print job creation request (NO in step S1002), the CPU 201 determines that the print job is a single job, and the processing proceeds to step S1004. Then, the CPU 201 generates a JobId and stores it in the JobId 1202 in the job management table 1201. When the JobId is stored in the JobId 1202, a null GroupId is stored in the GroupId 1203.

In step S1001, if the received message is a pull print request (PULL PRINT REQUEST in step S1001), the processing proceeds to step S1006. A JobId and a URL used for specifying print data are included in the pull print request. In step S1006, the CPU 201 stores the URL included in the received pull print request in the job management table 1201 in association with the corresponding JobId. In step S1007, the CPU 201 determines whether a GroupId of the JobId included in the received pull print request is stored in the job management table 1201.

If a GroupId is stored in the job management table 1201 (YES in step S1007), the processing proceeds to step S1008. In step S1008, the CPU 201 increments a pull print request reception number 1304 of the corresponding GroupId in the group management table 1301 by one. In step S1009, the CPU 201 determines whether the number of the pull print requests which have been received is equal to the value of the GroupSize. To be more precise, the CPU 201 determines whether the value of the pull print request reception number 1304 of the GroupID included in the pull print request, in other words, the number of times the pull print requests of the GroupId have been received, has reached the value of the GroupSize 1303 in the group management table 1301.

As a result of the determination in step S1009, if the CPU 201 determines that the number of times the pull print requests have been received has reached the value of the GroupSize (YES in step S1009), the processing proceeds to step S1010. On the other hand, if the CPU 201 determines that the number of times the pull print requests have been received has not yet reached the value of the GroupSize (NO in step S1009), the processing proceeds to step S1011. In step S1010, the CPU 201 specifies a JobId that belongs to a GroupId having a value same as the value of the GroupId to which the JobId of the pull print request belongs, collect information of these jobs in the job management table 1201, and submit the information of the jobs to the print queue. In step S1011, the CPU 201 generates a pull print request response and transmits the response to the computer 102.

In step S1007, if a GroupId is not included in the job management table 1201 (e.g., JobId 7 in FIG. 12) (NO in step S1007), the CPU 201 determines that the job is a single job, and the processing proceeds to step S1012. In step S1012, the CPU 201 submits the information of the single job to the print queue.

Figure 11:
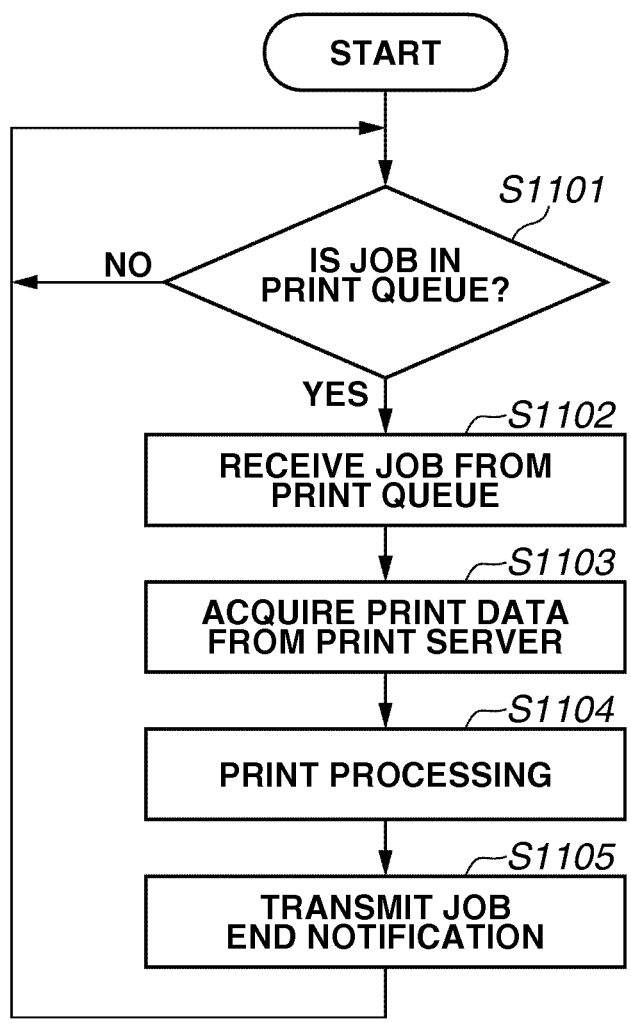
FIG. 11 is a flowchart illustrating processing executed by the image forming apparatus.

FIG. 11 is a flowchart illustrating processing performed by the image forming apparatus 101 when a program corresponding to the print processing unit 403 of the image forming apparatus 101 is executed.

The program of this flow corresponding to the print processing unit 403 is stored in the external storage device 211 or the ROM 203 of the image forming apparatus 101. The program is loaded into the RAM 202 and executed by the CPU 201.

In step S1101, the CPU 201 determines whether a job is in the print queue. If a job is in the print queue (Yes in step S1101), the processing proceeds to step S1102. In step S1102, the CPU 201 receives the print job from the print queue. A URL used for specifying the print data is in the print queue as job information. In the processing in step S1102, at least the URL is acquired from the job information of the job in the print queue.

In step S1103, the CPU 201 accesses the server 103 by using the URL acquired in step S1102 and acquires the print data specified by the URL from the server 103. In step S1104, the CPU 201 executes the print processing of the acquired print data. In step S1105, when the print processing ends, the CPU 201 transmits a job end notification to the server 103. Then, the processing returns to step S1101, and whether a job is in the print queue is determined again.

If a job end notification is issued for each document to the server 103, the server 103 is able to know the end of the processing of each document transmitted to the image forming apparatus 101. Further, the server 103 internally manages the processing state of each document according to this notification. Since the user that operates the computer 102 can access the server 103 by using the web browser in the computer 102, the user is able to know the processing state of each document.

The flowchart in FIG. 11 is executed for each job that exists in the print queue. Further, one job includes only one document. Thus, even if a group including a plurality of documents is generated, the user can obtain the end notification of the print processing for each document included in the group.

Figure 12:
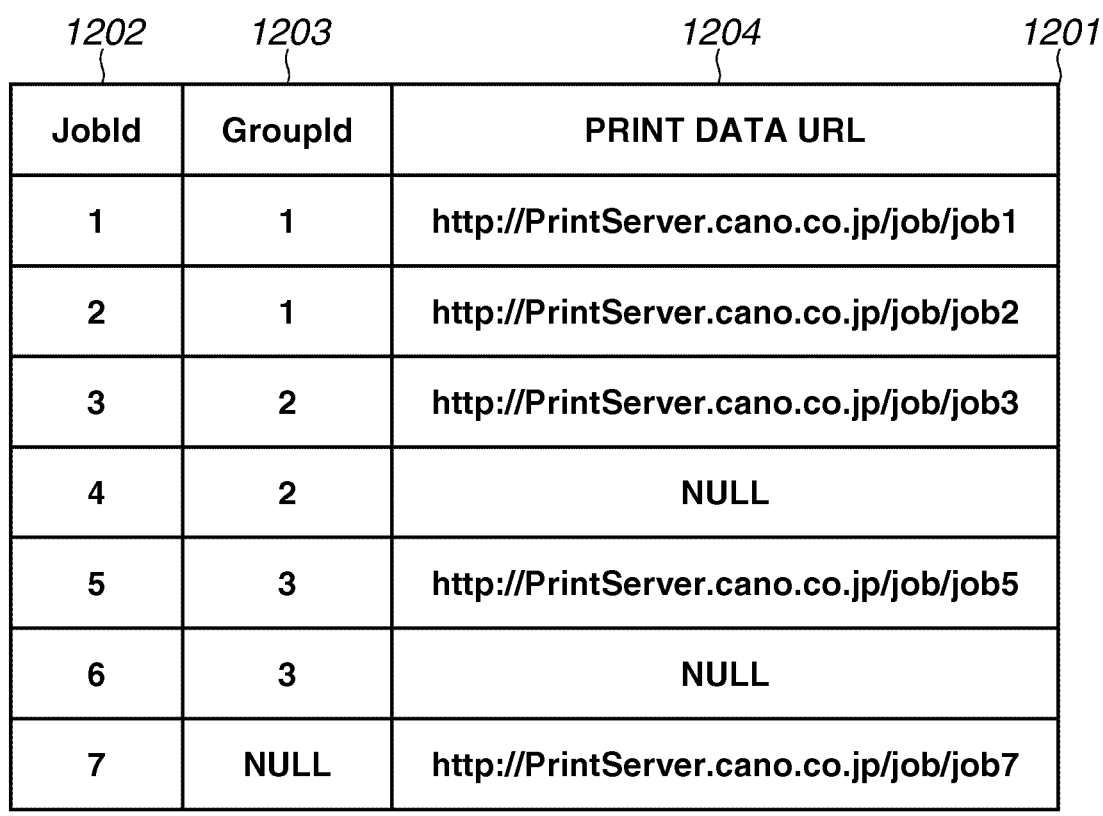
FIG. 12 illustrates an example of a job management table managed by the image forming apparatus.

FIG. 12 illustrates an example of the job management table 1201 stored in the image forming apparatus 101.

The JobId 1202 is identification information which the image forming apparatus 101 generates when the image forming apparatus 101 receives a print job creation request. The JobId is assigned to each job and is used to uniquely identify a job stored in the image forming apparatus 101. The JobId is, for example, an arbitrary number. The GroupId 1203 is information included in the received print job creation request. A URL 1204 is used for identifying print data as a print target. The URL 1204 is included in the received pull print request.

In the job management table 1201, at least the information of the JobId, the GroupId, and the URL is stored and managed in association with each job.

FIG. 13 illustrates an example of the group management table 1301 stored in the image forming apparatus 101.

The GroupId 1302 is information same as the GroupId 1203 in FIG. 12. The GroupSize 1303 is a value indicating a number of jobs (a number of documents) included in one Group. After receiving a number of pull print requests corresponding to the value of the GroupSize, the image forming apparatus 101 submits the jobs to the print queue. The pull print request reception number 1304 indicates a number of the pull print requests which have been received for each GroupId by then.

In the group management table 1301, at least the information of the GroupId, the GroupSize, and the pull print request reception number is stored and managed in association with each group.

Figure 14A:
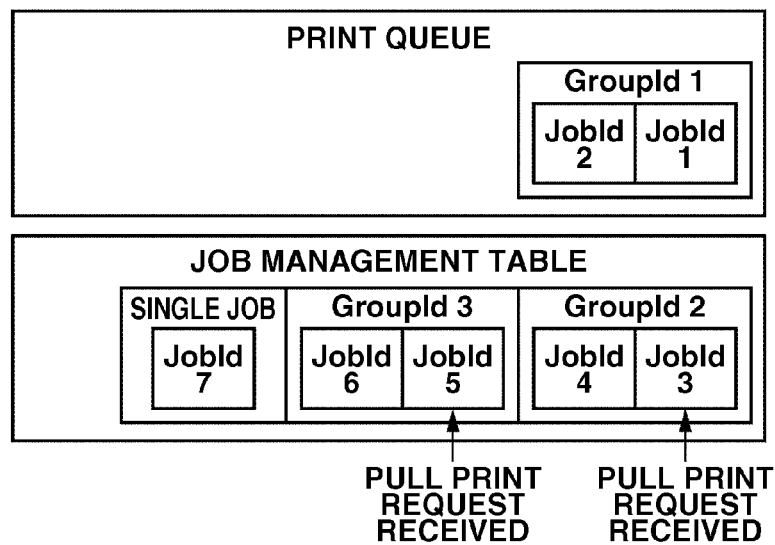
FIGS. 14A, 14B, and 14C illustrate flow of a print job submitted to a print queue.
Figure 14B:
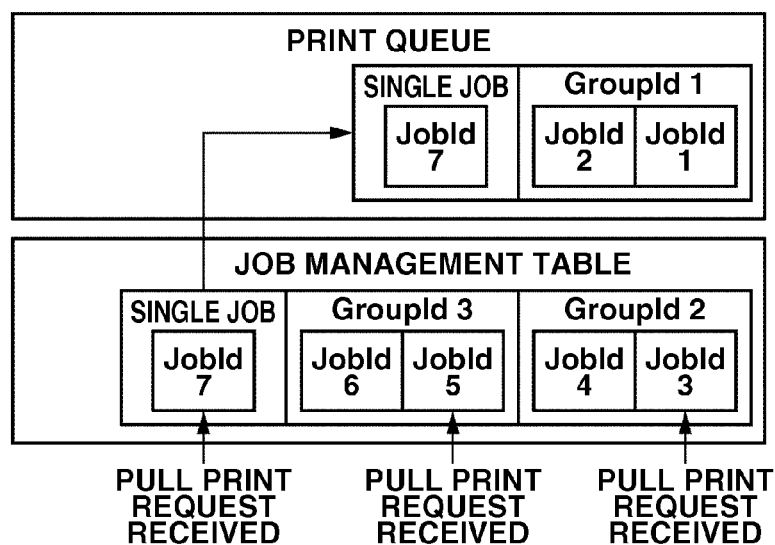
Figure 14C:
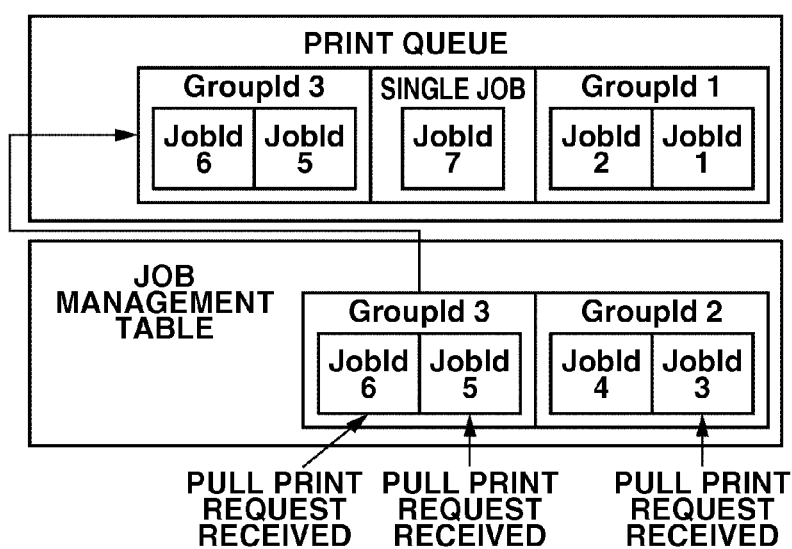

FIGS. 14A, 14B, and 14C schematically illustrate the submission of a job managed by the job management table 1201 to a print queue.

In FIG. 14A, a JobId 1 and a JobId 2 in a GroupId 1 are held in a print queue. The print processing unit 403 acquires the print jobs in the order they arrive in the print queue and executes the print jobs.

In the state in FIG. 14A, the job management table 1201 has received pull print requests for a JobId 3 included in a GroupId 2 and a JobId 5 included in a GroupId 3. Further, although job creation requests for a JobId 4 in the GroupId 2, a JobId 6 in the GroupId 3, and a JobId 7 for a single job are received, pull print requests for these jobs are not received yet.

Since all the pull print requests for the jobs in the GroupId 2 and the GroupId 3 are not received yet, the jobs of the GroupId 2 and the GroupId 3 are not submitted to the print queue. Accordingly, the jobs are in a waiting state for the execution of printing. Further, regarding the single job, since a pull print request of the single job is not received yet, the job is also waiting for the execution of printing. In this state, if a pull print request of the single job including the JobId 7 is received, the state is changed to the state in FIG. 14B.

When the pull print request for a single job including the JobId 7 is received, it is confirmed that a GroupId of the job is not included in the job management table 1201, which means that the job is a single job. Then, the print job is submitted to the print queue. In this state, since all the pull print requests for the jobs in the GroupId 2 and the GroupId 3 are not received yet, the jobs are not submitted to the print queue. Accordingly, the jobs are still in a state waiting for the execution of printing. Then, if a pull print request including the JobId 6 is received, the state is change to the state illustrated in FIG. 14C.

When the pull print request including the JobId 6 is received, according to the job management table 1201, it is confirmed that the GroupId of the JobId 6 is the GroupId 3. Then, the pull print request reception number 1304 of the GroupId 3 in the group management table 1301 is incremented by one. Further, it is confirmed that the pull print requests of a number corresponding to the GroupSize have been received. Then, the JobId 5 and the JobId 6 of the GroupId 3 are submitted to the print queue as one set to the job management table 1201.

In the state in FIG. 14C, regarding the GroupId 3, since the pull print requests of all the jobs included in the group are received, the print jobs of the GroupId 3 are submitted to the print queue, and the job processing of the print jobs will be started. On the other hand, since the pull print requests of all the jobs of the GroupId 2 are not received yet, the print jobs of the GroupId 2 are not submitted to the print queue. Accordingly, the jobs are in a state waiting for the execution of the printing.

In parallel with the processing illustrated in FIG. 14, the flow of the print processing unit described with reference to FIG. 11 is executed. Thus, the jobs submitted to the print queue are sequentially processed in the order. To be more precise, a group that includes a plurality of jobs is submitted to the print queue when all the pull print requests of the jobs in the group are received. Thus, all the jobs in the group are submitted to the print queue. Since the print jobs are processed in the order the print jobs arrived in the print queue, the jobs in the group are not interrupted by a job of a different group.

As described above, according to the configuration of the present embodiment, by managing a plurality of jobs as one group using a GroupId, the group can be prevented from being interrupted by a job of a different group between the jobs within the group. Further, since one job is assigned to one document, a plurality of documents that belong to the same group can be prevented from being interrupted by a document of a different group. Furthermore, management can be performed for each job in the group. For example, since a job end notification is transmitted to the user each time a job ends, the user is able to know the end of printing of each document in the group.

Next, a second exemplary embodiment of the present invention will be described.

According to a first exemplary embodiment, since the server 103 is on the Internet as illustrated in FIG. 1, the access from the server 103 to an apparatus on the LAN 120 is limited to a response to a request issued by the apparatus on the LAN 120. According to the second exemplary embodiment, the image forming apparatus 101, the computer 102, and the server 103 are connected to one LAN and can communicate with one another.

Figure 15:
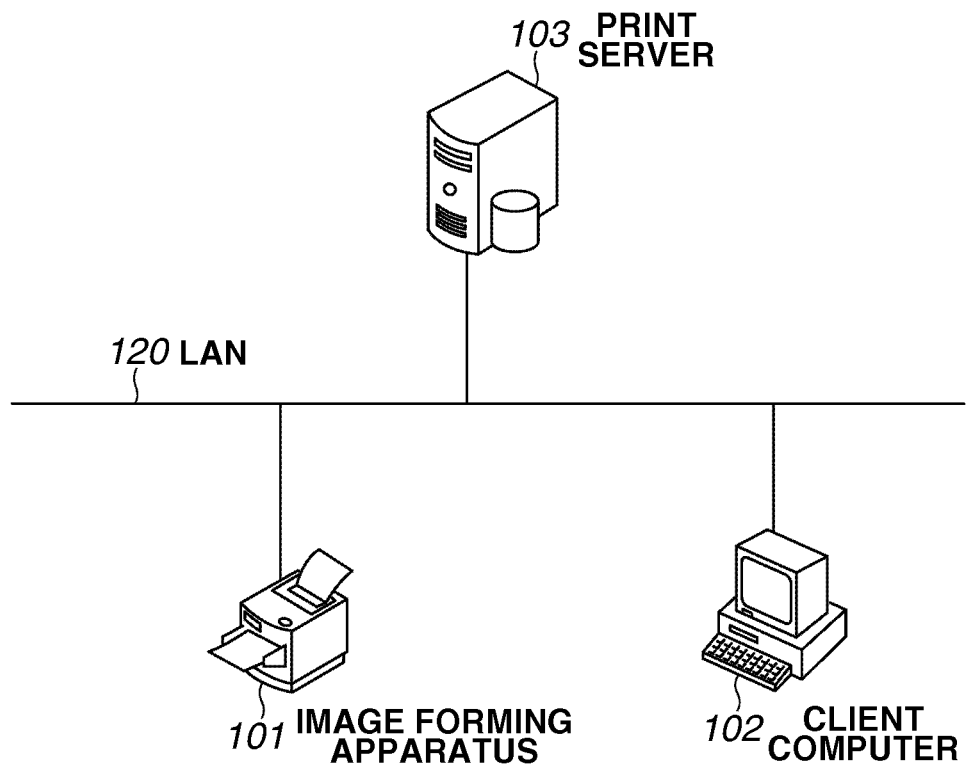
FIG. 15 illustrates a system configuration of the printing system according to a second exemplary embodiment of the present invention.

FIG. 15 illustrates a system configuration of the printing system according to the present embodiment.

In FIG. 15, the image forming apparatus 101, the computer 102, and the server 103 are connected to one another via the LAN 120. What is different from the printing system in FIG. 1 is that access from the server 103 to the image forming apparatus 101 and from the server 103 to the computer 102 is not blocked by a firewall. Other points are similar to those described with reference to FIG. 1. Further, since the hardware configuration and the software configuration of each apparatus are similar to those described with respect to the first exemplary embodiment, their descriptions are not repeated.

Figure 16:
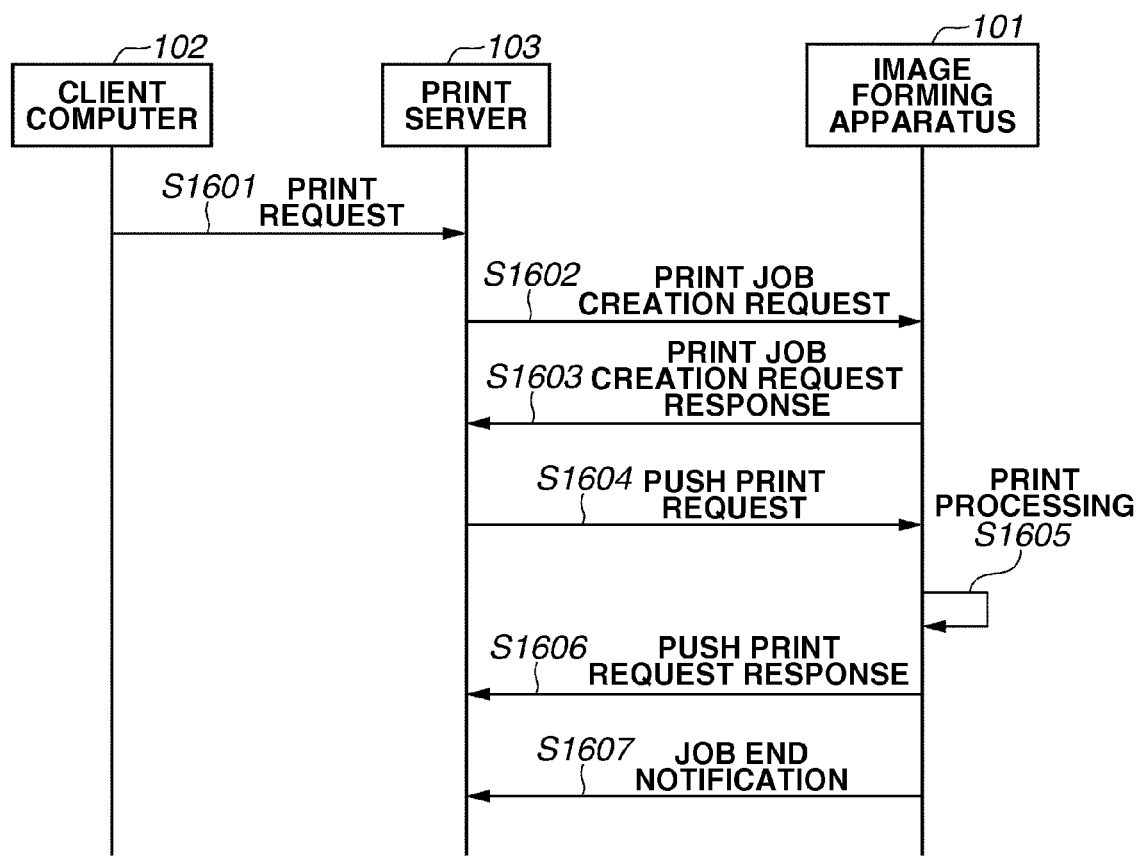
FIG. 16 is a sequence diagram of the print processing of the printing system according to the second exemplary embodiment.

FIG. 16 is a sequence diagram illustrating a print processing sequence of one job performed by the printing system according to the present embodiment.

A program of the image forming apparatus 101 of this print processing sequence is stored in the external storage device 211 or the ROM 203 of the image forming apparatus 101. The program is loaded into the RAM 202 and executed by the CPU 201. Further, each program of the server 103 and the computer 102 is stored in the external storage device 312 or the ROM 302 of each apparatus, and is loaded into the RAM 303 and executed by the CPU 301.

In S1601, the computer 102 accepts a print request of a document input by the user and transmits the print request to the server 103. In S1602, the server 103 transmits a print job creation request, such as the one illustrated in FIG. 9A, to the image forming apparatus 101. The print job creation request is a request for print job creation by the image forming apparatus 101. When the image forming apparatus 101 receives the print job creation request, it creates a print job. The print job includes a JobId which is job identification information used for identifying the print job.

In S1603, the image forming apparatus 101 transmits a print job creation request response, such as the one illustrated in FIG. 9B, to the server 103. A JobId, which is used by the server 103 when it identifies the print job, is included in the print job creation request response. The server 103 identifies the print job by this JobId included in the print job creation request response.

In S1604, the server 103 transmits a push print request, such as the one illustrated in FIG. 17, to the image forming apparatus 101. The push print request is transmitted from the server 103 to the image forming apparatus 101 so as to transmit binary data of the print data. Further, the push print request is transmitted as an execution instruction to execute a job which has been created according to the print job creation request.

In S1605, the image forming apparatus 101 prints the received print data. In S1606, when the printing is finished, the image forming apparatus 101 transmits a push print request response as a response to the push print request issued by the server 103 in S1604.

In S1607, the image forming apparatus 101 transmits a job end notification to the server 103. The job end notification is transmitted from the image forming apparatus 101 so as to notify the server 103 that the print processing is finished. Further, since the job end notification is transmitted each time one job ends, according to the present embodiment where a print job is created for one document, the job end notification is transmitted each time printing of one document is finished.

FIG. 17 illustrates an example of the push print request transmitted from the server 103 to the image forming apparatus 101.

A <SendDocumentRequest> tag 1701 designates a push print request. A <JobId> 1702 designates a JobId. A <DocumentData> tag 1703 designates a document as a print target. [Data] is binary data of a document as a print target. The image forming apparatus 101 executes the print processing by receiving the binary data and processing it.

Next, processing which is performed when a program corresponding to the print request reception unit 401 and the print processing unit 403 is executed by the image forming apparatus 101 of the present embodiment will be described.

When a program corresponding to the print request reception unit 401 is executed, the image forming apparatus 101 performs processing basically similar to the processing illustrated in the flowchart in FIG. 10. The processing different from the flowchart in FIG. 10 is that although the processing in FIG. 10 is branched according to whether the message received in step S1001 is a print job creation request or a pull print request, according to the present embodiment, the processing is branched according to whether the received message is a print job creation request or a push print request.

In other words, according to the present embodiment, a push print request is issued in place of the pull print request in FIG. 10. As a result, according to the present embodiment, in place of step S1006 in FIG. 10, the received print data (binary data included in the push print request) is stored in a storage device (e.g., the external storage device 211). Since other steps are similar to those described with reference to FIG. 10, their descriptions are not repeated.

Next, when a program corresponding to the print processing unit is executed, the image forming apparatus 101 performs processing basically similar to the processing illustrated in the flowchart in FIG. 11 except for the processing in step S1103. According to the example in FIG. 11, since the pull print is executed, print data is acquired from the server 103. On the other hand, according to the present embodiment, the pull print is not executed and the print data transmitted from the server 103 is already stored in the storage device of the image forming apparatus 101. Thus, according to the present embodiment, in place of step S1103 in FIG. 11, the print data stored in the storage device is acquired. Since other steps are similar to those in FIG. 11, their descriptions are not repeated.

As described above, according to the configuration of the present embodiment, even if an image forming apparatus, a client computer, and a print server exist on one LAN, an effect similar to the one obtained according to the first exemplary embodiment can be obtained. In other words, a plurality of documents that belong to the same group can avoid interruption by a document of a different group. Further, management can be performed for each job in the group. For example, since a job end notification is transmitted to the user each time a job ends, the user is able to know the end of printing of each document in the group.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-146504 filed Jun. 30, 2011, which is hereby incorporated by reference herein in its entirety.

What is claimed is:

1. A printing system in which at least a client apparatus and a server apparatus and at least a printing apparatus are to be connected, the printing system comprising:
   the client apparatus including:
      a display unit configured to display a list of documents stored in the server apparatus; and
      a first controlling unit having a processor which executes instructions stored in a memory or having circuitry, the first controlling unit being configured to:
      transmit, to the server apparatus, a printing request for printing a plurality of documents selected from the list of documents displayed by the display unit;

the server apparatus including:
  a second controlling unit having a processor which executes instructions stored in a memory or having circuitry, the second controlling unit being configured to:
    generate print data from the plurality of documents based on the transmitted printing request; and
    transmit, to the client apparatus, a generation request for generating a print job in response to the transmitted printing request; and
the printing apparatus including:
  a third controlling unit having a processor which executes instructions stored in a memory or having circuitry, the third controlling unit being configured to:
    generate a plurality of job identifications as many as a number of the plurality of documents selected in the client apparatus in response to receiving, from the client apparatus, the generation request transmitted from the server apparatus; and
    transmit, to the client apparatus, the generated plurality of job identifications,
wherein the second controlling unit of the server apparatus is further configured to transmit, to the client apparatus, a plurality of uniform resource locators and a plurality of job identifications corresponding to respective pieces of the print data in response to receiving, from the client apparatus, the plurality of job identifications transmitted from the printing apparatus, the uniform resource locators being information indicating a storing destination of the print data on the server apparatus, and
wherein the first controlling unit of the client apparatus is further configured to transmit, to the printing apparatus, the plurality of uniform resource locators and the plurality of job identifications transmitted from the server apparatus.

2. The printing system according to claim 1, wherein the printing apparatus further includes an acquiring unit configured to acquire, from the server apparatus, print data to be specified by the plurality of uniform resource locators in response to receiving the transmitted plurality of uniform resource locators.

3. The printing system according to claim 2, wherein the printing apparatus further includes a printing unit configured to print the print data acquired by the acquiring unit.

4. The printing system according to claim 3, wherein the third controlling unit of the printing apparatus is configured to issue a notification of information indicating that the printing unit finishes printing data each time the printing unit finishes one piece of print data.

5. A control method for a printing system in which at least a client apparatus and a server apparatus and at least a printing apparatus are to be connected, the control method comprising:
  displaying, by the client apparatus, a list of documents stored in the server apparatus;
  transmitting, from the client apparatus to the server apparatus, a printing request for printing a plurality of documents selected from the displayed list of documents;
  generating, by the server apparatus, print data from the plurality of documents based on the printing request transmitted from the client apparatus;
  transmitting, from the server apparatus to the client apparatus, a generation request for generating a printing job in response to the printing request transmitted from the client apparatus;
  generating, by the printing apparatus, a plurality of job identifications as many as a number of the plurality of documents selected in the client apparatus in response to receiving, from the client apparatus, the generation request transmitted from the server apparatus;
  transmitting, from the printing apparatus to the client apparatus, the plurality of job identifications generated by the printing apparatus;
  transmitting, from the server apparatus to the client apparatus, the plurality of uniform resource locators and the plurality of job identifications corresponding to the respective pieces of print data generated by the server apparatus, in response to receiving, from the client apparatus, the plurality of job identifications transmitted from the printing apparatus, the uniform resource locators being information indicating a storing destination of the print data on the server apparatus; and
  transmitting, from the client apparatus to the printing apparatus, the plurality of uniform resource locators and the plurality of job identifications transmitted from the server apparatus.

6. A non-transitory computer-readable storage medium storing a computer program that upon execution by a computer causes the computer to perform a control method for a printing system in which at least a client apparatus and a server apparatus and at least a printing apparatus are to be connected, the control method comprising:
  displaying, by the client apparatus, a list of documents stored in the server apparatus;
  transmitting, from the client apparatus to the server apparatus, a printing request for printing a plurality of documents selected from the displayed list of documents;
  generating, by the server apparatus, print data from the plurality of documents based on the printing request transmitted from the client apparatus;
  transmitting, from the server apparatus to the client apparatus, a generation request for generating a printing job in response to the printing request transmitted from the client apparatus;
  generating, by the printing apparatus, a plurality of job identifications as many as a number of the plurality of documents selected in the client apparatus in response to receiving, from the client apparatus, the generation request transmitted from the server apparatus;
  transmitting, from the printing apparatus to the client apparatus, the plurality of job identifications generated by the printing apparatus;
  transmitting, from the server apparatus to the client apparatus, the plurality of uniform resource locators and the plurality of job identifications corresponding to the respective pieces of print data generated by the server apparatus, in response to receiving, from the client apparatus, the plurality of job identifications transmitted from the printing apparatus, the uniform resource locators being information indicating a storing destination of the print data on the server apparatus; and
  transmitting, from the client apparatus to the printing apparatus, the plurality of uniform resource locators and the plurality of job identifications transmitted from the server apparatus.

7. A printing apparatus which is able to communicate with a client apparatus and a server apparatus configured to store a plurality of documents, the printing apparatus comprising:
- a controlling unit having a processor which executes instructions stored in a memory or having circuitry, the controlling unit being configured to:
  - receive, from the client apparatus, a generation request for generating a printing job;
  - generate a plurality of job identifications as many as a number of a plurality of documents selected in the client apparatus in response to receiving the generation request;
  - transmit, to the client apparatus, the generated plurality of job identifications; and
  - receive, from the client apparatus, a plurality of uniform resource locators corresponding to the plurality of job identifications, the uniform resource locators being information indicating a storing destination of print data on the server apparatus.

8. A control method of a printing apparatus which is able to communicate with a client apparatus and a server apparatus configured to store a plurality of documents, the control method comprising:
- receiving, from the client apparatus, a generation request for generating a printing job;
- generating a plurality of job identifications as many as a number of a plurality of documents selected in the client apparatus in response to receiving the generation request;
- transmitting, to the client apparatus, the generated plurality of job identifications; and
- receiving, from the client apparatus, a plurality of uniform resource locators corresponding to the plurality of job identifications, the uniform resource locators being information indicating a storing destination of print data on the server apparatus.

9. A non-transitory computer-readable storage medium storing a computer program that upon execution by a computer causes the computer to perform a control method of a printing apparatus, the printing apparatus able to communicate with a client apparatus and a server apparatus configured to store a plurality of documents, the control method comprising:
- receiving, from the client apparatus, a generation request for generating a printing job;
- generating a plurality of job identifications as many as a number of a plurality of documents selected in the client apparatus in response to receiving the generation request;
- transmitting, to the client apparatus, the generated plurality of job identifications; and
- receiving, from the client apparatus, a plurality of uniform resource locators corresponding to the plurality of job identifications, the uniform resource locators being information indicating a storing destination of print data on the server apparatus.

\* \* \* \* \*